United States Patent
Schneider

[15] 3,655,913

[45] Apr. 11, 1972

[54] ARRANGEMENT FOR SYNCHRONIZING TELEVISION CAMERAS

[72] Inventor: Hans-Dieter Schneider, Gross-Gerau, Germany

[73] Assignee: Fernseh GmbH, Darmstadt, Germany

[22] Filed: Apr. 21, 1970

[21] Appl. No.: 30,428

[30] Foreign Application Priority Data

Apr. 25, 1969 Germany ....................P 19 21 104.2

[52] U.S. Cl. ..............................178/69.5 DC, 178/69.5 TV

[51] Int. Cl. ........................................H04n 5/04

[58] Field of Search ..........178/69.5 TV, 69.5 DC, DIG. 13, 178/7.2

[56] References Cited

UNITED STATES PATENTS 3,165,585 1/1965 James ..........................178/69.5 DC
3,210,470 10/1965 Dieters ..........................178/69.5 DC
3,311,702 3/1967 Legler ..........................178/69.5 DC
3,368,034 2/1968 Dischert et al. ..............178/69.5 DC

*Primary Examiner*—Robert L. Griffin
*Assistant Examiner*—John C. Martin
*Attorney*—Michael S. Striker

[57] ABSTRACT

A circuit used to synchronize a television camera interconnected to a camera control unit through a cable having a plurality of conductive leads. An oscillator within the camera generates a rectangular-shaped pulse signal at line frequency, and applies this signal to a phase comparator in the control unit. The signal is transmitted from the oscillator through the cable. The phase comparator compares the rectangular-shaped pulse signal with a reference signal, and provides a control voltage which, in turn, is applied to the oscillator through a conductor within the cable. The signal derived from the oscillator may be in the form of closely spaced pulses of opposite polarity and short direction. The signal can also be in the form of a pair of pulse trains of opposite polarity and transmitted through the cable by a twisted pair of conductors.

6 Claims, 2 Drawing Figures

Inventor:
Hans-Dieter Schneider by [signature]
Attorney

ARRANGEMENT FOR SYNCHRONIZING TELEVISION CAMERAS

BACKGROUND OF THE INVENTION

The present invention resides in a circuit arrangement used to synchronize a television camera connected to a control unit through a camera cable.

The interconnecting cable between television cameras and the control apparatus, may be of considerable length in practice. For this reason, the transit times of the electrical signals through the cable cannot be neglected. The synchronizing pulses for the deflection devices are transmitted from the control apparatus and through the camera cable, for the purpose of synchronizing the deflecting devices within the camera. As a result, a single transit time is to be taken into account. The television signals generated within the camera are transmitted through the camera cable in opposite directions. In this manner, the signals finally reach the camera control unit, after a delay of twice the transit time of the cable, when compared with the synchronizing pulses.

To adapt the requirement of avoiding effects from the transit time, so that they are independent of the length of the camera cable, phase shifting circuits are commonly used in the art for shifting the phase of the horizontal synchronizing pulses applied to the camera, so that the television signals exhibit the correct phase relationship upon arriving at the camera control apparatus. These phase-shifting circuits are provided within the camera control apparatus.

To facilitate handling, the camera cable should be as light in weight and as mobile or transportable as possible. Such features of the cable, however, are achieved only at the expense of cross-talk damping. As a result, the pulses which are transmitted through the camera cable, may give rise to disturbing effects in the video or picture signals. Such disturbing effects occur particularly in the case of pulses which do not appear during the line or picture frequency flyback. Thus, such pulses are transmitted through the cable in opposite direction to the picture or video signals.

Accordingly, it is the object of the present invention to provide a circuit arrangement through which the above-mentioned disadvantages are avoided. It is the object of the present invention to provide a television camera which can be synchronized in a manner so that the television signals are received by the camera control unit in the correct phase relationship.

The objects of the present invention are achieved by providing an oscillator in the television camera. This oscillator oscillates at line frequency and has an output signal which is transmitted through the camera cable, and to a phase comparison circuit located in the camera control unit. A control voltage is developed by the phase comparator circuit and is, in turn, transmitted through the camera cable and applied to the oscillator.

The advantage of the present invention resides in the element that instead of the line frequency pulses, a direct voltage is transmitted from the control apparatus to the camera. This direct voltage cannot, because of its inherent characteristic, cause any disturbances in the television signals.

Since the signal derived from the oscillator passes through the cable in the same direction as the television signals, the phase relationship of this signal can be selected so that it appears only during the horizontal frequency flybacks. Disturbances, however, may even arise under these conditions. In accordance with the present invention, therefore, various embodiments for transmitting the signal are disclosed, so that satisfactory results are realized from the viewpoint of cross-talk.

In accordance with the present invention, the input resistance or impedance of the phase comparator is also small, when compared with the wave resistance of the line transmitting the signal. For this reason, the signal is transmitted in the form of a current pulse rather than in the form of a voltage pulse. As a result, even at the end of the camera cable closest to the camera, only a substantially small voltage signal is required.

SUMMARY OF THE INVENTION

An electronic arrangement for synchronizing a television camera. The television camera is connected to a camera control unit through a cable having a plurality of leads. An oscillator within the camera provides an output signal of rectangular-shaped pulses. The oscillator oscillates at line frequency. The output signal from the oscillator is applied to a phase comparator at one input terminal. A reference pulse signal is applied to a second input of the comparator. The comparator provides an output signal in the form of a control voltage which is applied to the oscillator through the cable. The signal from the oscillator may be composed, in one embodiment, of two closely spaced pulses of short duration of opposite polarity, at line frequency.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
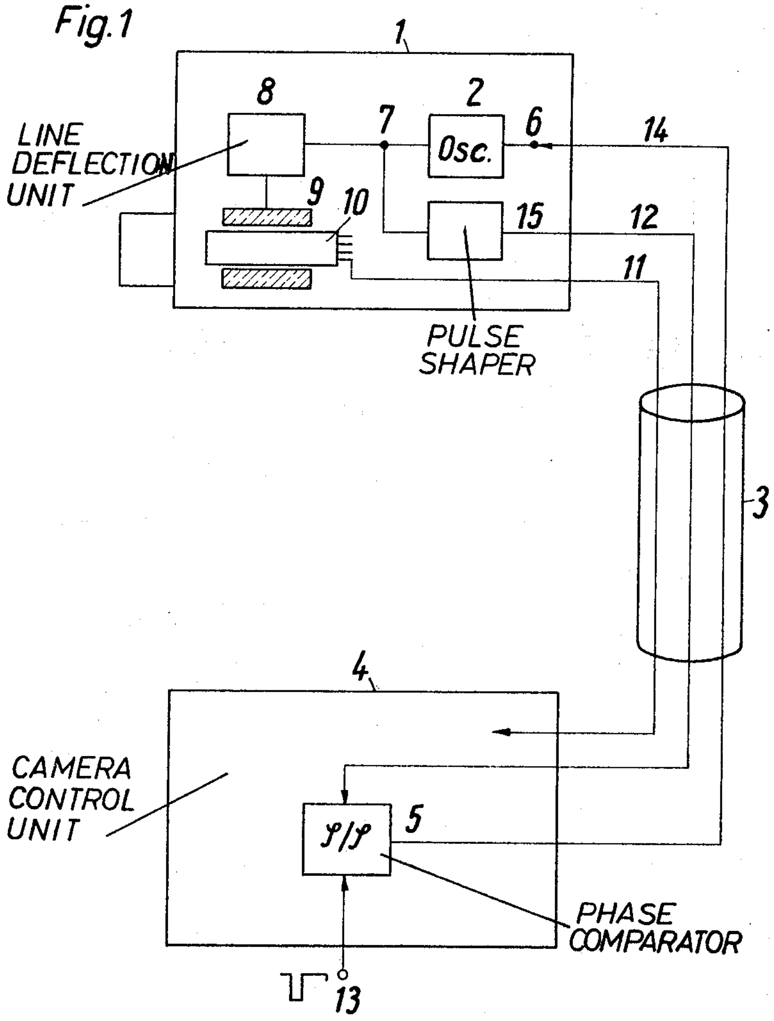
FIG. 1 is a schematic diagram of a television camera connected to a camera control unit through a cable, in accordance with the present invention.

Referring to the drawing, there is shown therein only those components which are essential to the understanding of the present invention. The elements not shown in the drawing, for example, those used for vertical deflection and the video amplifier, are of conventional design and can be produced through the techniques well known in the art.

The television camera 1 contains an oscillator 2 with frequency at the line frequency. The frequency of the oscillator can be varied through a control voltage applied to the terminal 6. The output of the oscillator is available at the terminal 7, and is applied to the line deflection apparatus 8 for purposes of synchronization. This same voltage at the terminal 7 may also be used for purposes of clamping and blanking, for example. These additional functions of the voltage at the terminal 7, however, are not shown in the drawing for the purpose of preventing unnecessary complications and obscuring the description of the present invention.

The line deflection unit or apparatus 8 operates in conjunction with a line deflection coil 9 for the purpose of deflecting the scanning beam in the camera tube 10. The camera tube 10 transmits picture or video signals which are suitably amplified and transmitted along line 11 of camera cable 3, and into the camera control unit 4 for further processing.

The output voltage of the oscillator 2 is in the form of a pulsed signal having rectangular-shaped pulses. These pulses are transmitted through the core of the camera cable, and to the phase comparison circuit 5. This comparator 5 compares the phase of the signal from the osciallator 2 with the phase of the horizontal frequency pulses applied at the terminal 13. A control voltage representing the phase difference between these two signals applied to the inputs of the comparator 5, is transmitted through the line 14 of the camera cable 3, and to the input terminal 6 of the oscillator 2. The application of this control voltage to the terminal 6 of the oscillator, assures that the oscillator 2 oscillates at line frequency. The control voltage also assures that the output signal from the oscillator is of the phase relationship so that the correct phase is realized for the picture or video signals in the camera control apparatus.

It is possible, at times, that the pulses occuring during the flybacks, can cause disturbances in the video signals. For this reason, the output pulses of the oscillator 2 are shaped through the pulse shaper or former 15, so that they can cause substantially no disturbances through cross-talk in the picture or video signals. This may be achieved, in accordance with the present invention, by selecting the input resistance of the phase comparison circuit, to be of small magnitude for the signals applied to line 12. Thus, the input impedance of the phase comparator 5 for signals on the line 12 is to be small to the extent that such impedance or resistance represents substantially a short circuit. The transmission of the signals is then accomplished not through the use of voltage pulses, but instead through current pulses. As a result of this arrangement, the voltage is substantially small, and this does not have a disturbing effect on the picture or video signals through capacitive cross-talk at the camera end of the cable 3.

Figure 2:
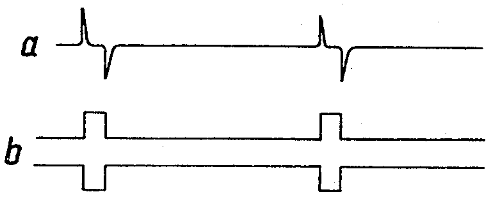
FIG. 2 is a waveform diagram of signals transmitted from the camera to the control unit, through the arrangement of FIG. 1.

For the purpose of also preventing inductive cross-talk, the signal can be suitably shaped through the pulse shaper or former 15. Since inductive cross talk is limited in the direction of high frequencies, it is possible to use for the signal, two closely spaced pulses of different polarity. Such closely spaced pulses of different polarity may be obtained, for example, from the differentiation of a rectangular pulse. The voltage-time diagrams for such pulses are shown in FIG. 2*a*. FIG. 2*b* shows a pair of pulses of opposite polarity, which can be applied to the camera control unit, through a pair of conducting elements within the cable, as for example, a twisted pair of leads. Through such design, inductive cross talk is also substantially avoided.

By modulating a high frequency oscillatory signal, other possibilities exist in transmitting the signal from the camera to the camera control unit. The oscillatory signal for this purpose, has a frequency which lies preferably outside the video band width. Further possibility for transmitting the signal from the camera to the camera control unit also exists through the injection of a synchronizing pulse into the picture or video signal, to the extent that this is consistent with the type of further processing to which the video signal is subjected.

Whereas FIG. 1 shows a television camera with one camera tube, the circuit arrangement shown therein, can also be readily adapted to color television cameras.

It will be understood that each of the elements described above, or two or more together, may also find a useful application in other types of constructions differing from the types described above.

While the invention has been illustrated and described as embodied in an arrangement for synchronizing a television camera, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. An arrangement for synchronizing a television camera comprising, in combination, a television camera; camera control means; a camera cable interconnecting said camera with said control means; oscillator means for oscillating at a predetermined line frequency, said oscillating means synchronizing said television camera when said oscillating at said predetermined line frequency; phase comparison means in said control means and receiving an output signal from said oscillator means through said cable, said output signal from said oscillating means being a periodic signal with frequency equal to the frequency of said oscillator means; input signal means for applying to said comparison means a periodic signal with frequency equal to said line frequency, said phase comparison means comparing said output signal from said oscillator means with said periodic signal from said input signal means and providing an output control voltage as the difference in phase between said oscillator output signal and said periodic signal from said input signal means; and connection for transmitting said control voltage through said cable to said oscillator means in said camera, said oscillating means oscillating at said predetermined line frequency when said difference in phase is zero, whereby said television camera is synchronized when said oscillator means oscillates at line frequency, the input resistance of said phase comparison for receiving said signal from said oscillating means being substantially small compared to the characteristic impedance of the signal transmission line of said cable transmitting said signal from said oscillating means to said phase comparison means.

2. The arrangement as defined in claim 1, wherein the internal resistance of said connection means for applying said control voltage to said cable is large compared to the input resistance of said phase comparison means.

3. The arrangement as defined in claim 1, including means for transmitting said signal output from said oscillating means through said camera cable during the line frequency flybacks.

4. The arrangement as defined in claim 1 wherein said signal transmitted through said cable from said oscillating means to said phase comparison means comprises two trains of closely spaced pulses of line frequency and opposite polarity, only one of said trains being applied to said comparison means for comparing with said periodic signal from said input signal means.

5. The arrangement as defined in claim 4 wherein said closely spaced pulses are of substantially short duration.

6. The arrangement as defined in claim 1 wherein said signal output from said oscillating means to said phase comparison means comprises a pair of pulse signals of opposite polarity transmitted through said camera cable through twisted conducting leads.

* * * * *